US011594991B1

(12) United States Patent
Sun et al.

(10) Patent No.: US 11,594,991 B1
(45) Date of Patent: Feb. 28, 2023

(54) ROBUST POSITION CONTROL METHOD FOR PERMANENT MAGNET SYNCHRONOUS MOTOR CONSIDERING CURRENT LIMITATION

(71) Applicant: DALIAN UNIVERSITY OF TECHNOLOGY, Liaoning (CN)

(72) Inventors: Ximing Sun, Liaoning (CN); Jianyi Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 87 days.

(21) Appl. No.: 17/429,880

(22) PCT Filed: Jan. 7, 2021

(86) PCT No.: PCT/CN2021/070547
§ 371 (c)(1),
(2) Date: Aug. 10, 2021

(87) PCT Pub. No.: WO2022/147701
PCT Pub. Date: Jul. 14, 2022

(51) Int. Cl.
*H02P 21/00* (2016.01)
*H02P 21/22* (2016.01)
(52) U.S. Cl.
CPC .................................. *H02P 21/22* (2016.02)
(58) Field of Classification Search
CPC ...................................................... H02P 21/22
USPC .................................................. 318/400.02
See application file for complete search history.

(56) References Cited

U.S. PATENT DOCUMENTS

| | | | |
|---|---|---|---|
| 8,497,655 B2* | 7/2013 | Liu | H02P 21/0007 318/705 |
| 9,093,940 B2* | 7/2015 | Xu | H02P 21/18 |
| 10,291,160 B1* | 5/2019 | Latham | H02K 21/12 |
| 10,333,444 B2* | 6/2019 | Li | H02P 27/12 |
| 10,658,955 B2* | 5/2020 | Lee | H02P 25/03 |

FOREIGN PATENT DOCUMENTS

| | | |
|---|---|---|
| CN | 108322120 A | 7/2018 |
| CN | 110190795 A | 8/2019 |
| CN | 111010062 A | 4/2020 |
| CN | 111987943 A | 11/2020 |

* cited by examiner

*Primary Examiner* — Erick D Glass
(74) *Attorney, Agent, or Firm* — Muncy, Geissler, Olds & Lowe, P.C.

(57) ABSTRACT

A robust position control method for a permanent magnet synchronous motor considering current limitation is provided. The method fully considers the influence of current limitation on a closed loop system in controller design, stability analysis and other theoretical analysis phase, can effectively overcome the influence of system disturbances including system parameters uncertainty and unknown load torque, and finally realize a control objective of accurate tracking of the motor position. More importantly, the technology is a continuous control method which can overcome the inherent chattering problem while having strong robustness of sliding mode control. Meanwhile, a controller designed by the present invention also has the advantages of simple structure, etc. The technical solution proposed by the present invention has wide practical application prospect due to the characteristics of excellent anti-disturbance capability, and simple and feasible structure.

1 Claim, 5 Drawing Sheets

ROBUST POSITION CONTROL METHOD FOR PERMANENT MAGNET SYNCHRONOUS MOTOR CONSIDERING CURRENT LIMITATION

TECHNICAL FIELD

The present invention belongs to the technical field of alternating current (AC) permanent magnet synchronous motor (PMSM) control, and more particularly relates to a position control technology for a PMSM capable of realizing accurate tracking of the motor position on the basis of effectively overcoming the influence of system disturbances including current limitation, unknown load torque and system parameters uncertainty.

BACKGROUND

Precision position control has become more and more important in many applications such as assembly robot, semiconductor production machine, high-resolution numerical control machine and aero-engine power transmission. Because of having good characteristics of high efficiency, small volume, large torque to weight ratio and almost no maintenance, a PMSM becomes an important tool in the field of precise position control. Meanwhile, complex nonlinear characteristic, strong coupling characteristic and presence of internal and external system disturbances also increase the difficulty of precise position control of the PMSM.

In the position control of an industrial PMSM, a three closed loop cascade control structure of position loop-speed loop-current loop is usually adopted. In particular, the controllers used in the speed loop and current loop are PI controllers, and the controller used in the position loop is a most basic P controller. Such control method has the advantages of simple realization, convenient adjustment and the like, but belongs to a linear control technology in essence. A PMSM system is a nonlinear system of state coupling, meaning that the PI control scheme is difficult to obtain excellent dynamic performance, and has poor robustness, so the performance may deteriorate rapidly in the face of system parameters uncertainty and unknown load torque disturbance.

In order to realize high-accuracy position control of the PMSM, advanced control algorithms such as adaptive control, robust control and sliding mode control are put forward in succession, and then numerous practical industrial application problems are solved. However, although the position control of the PMSM has made great progress, numerous open problems still exist which deserve to be considered and solved.

1) For safety reasons, for many methods at present, an amplitude limited element is added after the reference current of the current loop to indirectly realize the constraint on the motor current and prevent the current from exceeding the limit value. However, when conducting controller design and stability analysis, most of the existing technical solutions do not consider the influence of the current amplitude limited element on the system, that is to say, the amplitude limited element is ignored during theoretical analysis and is directly added in practical application. However, the presence of the amplitude limited element may influence the system dynamics, since the value of the reference current will be kept at a constant value after exceeding the limit of the amplitude limited element, the reference current is no longer the same as the designed reference current, and the change of the reference current means that the actual current of the motor may also change with the reference current, as a direct result, the dynamic response of the system is obviously different from that of the system in the absence of the amplitude limited element, and even the stability of the system may be destroyed under serious conditions. Therefore, in the theoretical analysis phase before the actual industrial application of the controller, the influence of the presence of the amplitude limited element on the system response should be fully considered, and the adverse effects on the dynamic performance and stability of the system should be avoided or suppressed in a reasonable manner.

2) Internal and external system disturbances including system parameters uncertainty and unknown load torque influence is always one of the most difficult technical problems ailing PMSM control. In particular, in practical industrial application, on the one hand, due to the influence of operating environment change and other factors, certain deviations are usually present between the actual values of the parameters of the PMSM system and the nominal values thereof, which may result in a large reduction in the control performance of many algorithms depending on the precise parameters of the system. On the other hand, in many practical operating conditions, the load torque of the PMSM system is often unknown and is in change, which may obviously affect the position control and speed tracking performance of the PMSM. An existing effective method to deal with the influence of system disturbances is a sliding mode control algorithm, which has the advantages of strong robustness, quick dynamic response and the like, but belongs to a discontinuous control algorithm in essence, and a discontinuous signum function term contained in the controller thereof may cause chattering of the system. However, chattering is the biggest obstacle in the practical application of sliding mode control. The presence of chattering may worsen the dynamic performance and static performance of the system, and aggravate the mechanical loss and energy consumption of the system. In more serious cases, high-frequency chattering may excite the unmodeled dynamics of the system, severely destroy the stability of the system, and even cause the control system to fail to operate normally.

In conclusion, it is a problem urgently to be solved at present about how to fully consider the presence of a current amplitude limited element in the design of a position control algorithm of a PMSM and ensure that the proposed method can effectively suppress the influence of internal and external system disturbances on the premise of not introducing chattering, to finally realize accurate position control of the PMSM.

SUMMARY

To overcome the defects and deficiencies existing in the position control method for a PMSM in prior art, the present invention provides a robust position control method for a PMSM considering current limitation. The method fully considers the influence of current limitation on a closed loop system in controller design, stability analysis and other theoretical analysis phase, can effectively overcome the influence of system disturbances including system parameters uncertainty and unknown load torque, and finally realize a control objective of accurate tracking of the motor position. More importantly, the technology is a continuous control method which can overcome the inherent chattering problem while having strong robustness of sliding mode control.

The technical solution of the present invention is as follows:

A robust position control method for PMSM considering current limitation, comprising steps of:

Step 1: determining a dynamic equation of a PMSM influenced by amplitude limited element and disturbances:

in an actual system, a dynamic equation of a PMSM control system is expressed as:

$$\ddot{\theta} = \frac{K_t}{J} i_q - \frac{B}{J} \dot{\theta} - \frac{T_L}{J}$$

where $\theta$ represents a motor rotor angle, $i_q$ represents q axis stator current in d-q coordinate system, $K_t$ represents a torque constant, J represents a moment of inertia of the motor, B represents a viscous friction coefficient, $T_L$ represents load torque.

It should be pointed out that the parameters in the above equation are all actual system parameters, and the true values of these parameters are often difficult to obtain in practical application, so researchers can only obtain the nominal values of relevant parameters. Thus, by further considering the influence of system parameters uncertainty, unknown load torque and current loop tracking error, the dynamic equation of the PMSM may be rewritten as:

$$\ddot{\theta} = \frac{K_{to}}{J_o} i_q^* - \frac{B_o}{J_o} \dot{\theta} + \left( \frac{K_{to}}{J_o} + \Delta \frac{K_t}{J} \right)(i_q - i_q^*) + \Delta \frac{K_t}{J} i_q^* - \Delta \frac{B}{J} \dot{\theta} - \frac{T_L}{J}$$

where $i_q^*$ represents a reference value of the stator current of q axis, $K_{to}$, $J_o$, and $B_o$ respectively represent nominal values of the torque constant, the moment of inertia, and the viscous friction coefficient, $$\Delta \frac{K_t}{J} = \frac{K_t}{J} - \frac{K_{to}}{J_o} \text{ and } \Delta \frac{B}{J} = \frac{B}{J} - \frac{B_o}{J_o}$$

represent deviations between the true values of the system parameters and the nominal values.

The influence of the amplitude limited element on the reference current is expressed by the following equation:

$$i_q^* = f(u) = \begin{cases} I_{max} & u \geq I_{max} \\ u & -I_{max} < u < I_{max} \\ -I_{max} & u \leq -I_{max} \end{cases};$$

where u(t) represents a control input to be designed, i.e. a PMSM position loop controller, $I_{max}$ represents a limitation value of the amplitude limited element.

Thus, the following relation holds: $i_q^* = f(u) = u + \Delta u$;

where $\Delta u = f(u) - u$ represents the influence caused by the amplitude limited element.

To sum up, a complete dynamic equation of the PMSM comprehensively considering influence of system disturbances and amplitude limited element can be obtained:

$$\ddot{\theta} = \frac{K_{to}}{J_o} u - \frac{B_o}{J_o} \dot{\theta} - d;$$

where d(t) represents a lumped disturbances term of which the specific expression is:

$$d = -\left( \frac{K_{to}}{J_o} + \Delta \frac{K_t}{J} \right)(i_q - i_q^*) - \frac{K_t}{J} i_q^* + \Delta \frac{B}{J} \dot{\theta} + \frac{T_L}{J} - \frac{K_{to}}{J_o} \Delta u;$$

Step 2: determining a control objective and constructing auxiliary signals:

in the position control of PMSM, the main object is to ensure that the motor rotor angle can reach the given position accurately in a limited time, that is $$\lim_{t \to \infty} \theta(t) = \theta_d$$

where $\theta_d(t)$ represents a target rotor position of the PMSM;

A position tracking error signal is further defined as $e_1 = \theta_d - \theta$.

On this basis, for the follow-up controller design and stability analysis, auxiliary signals of the following forms are constructed: $e_2 = \dot{e}_1 + \alpha e_1$, $r = \dot{e}_2 + \beta e_2$ where both $\alpha$ and $\beta$ are positive constants greater than 0.

Step 3: designing a robust position controller and conducting stability analysis of the closed loop system:

based on step 1 and step 2, a PMSM robust position controller of the following form is given:

$$u = \frac{J_o}{K_{to}} \left[ (k+1)e_2 - (k+1)e_2(0) + \int_0^t [(k+1)\beta e_2(\tau) + 2\lambda \text{sgn}(e_2(\tau))] d\tau \right]$$

where k and $\lambda$ are positive control gains.

A Lyanunov function candidate is constructed:

$$V = \frac{1}{2} r^2 + \frac{1}{2} e_1^2 + \frac{1}{2} e_2^2 + 2\lambda |e_2| - Ne_2$$

Then, in combination with the Lyapunov stability method and LaSalle-Yoshizawa theorem, asymptotic stability of the closed loop system is proved.

Step 4. realizing a technical solution:

the position and speed of the motor are measured in real time by a sensor installed in the PMSM first, system state variables are obtained and substituted into the robust position controller given in step 3 to obtain a control signal, the control signal is taken as a controller of a position loop of the PMSM, so as to accurately track the position of the motor rotor and effectively suppress the influence of disturbances including system parameters uncertainty, unknown load torque and current limitation to ensure that a PMSM system can still realize a quick and accurate positioning function under the influence of disturbances.

Compared with the prior art, the present invention has the following advantages:

(1) In the prior art, for most methods, the presence of a current amplitude limited element is neglected in controller design, dynamic performance analysis of a system and other phases. However, the presence of the amplitude limited element may affect the dynamic performance and stability of the system. One advantage of the technical solution proposed by the present invention is that the influence of the amplitude limited element on the system is carefully considered. In the theoretical analysis phase, the present invention mathematically describes the amplitude limited element and suppresses the influence thereof through a designed robust controller, and the system stability analysis process proves that even if the influence of the amplitude limited element is present, the technical solution proposed by the present invention can still achieve the established control objective.

(2) The position control technology for a PMSM proposed by the present invention can effectively overcome the influence of the system disturbances including system parameters uncertainty and unknown load torque, and can keep the high-performance position control effect under the influence of the system disturbances, which indicates that the control algorithm designed by the present invention has high anti-disturbance capability and robustness. Meanwhile, unlike the sliding mode control algorithm with the same high anti-disturbance capability, the control algorithm proposed by the present invention is a continuous robust control algorithm without discontinuous function terms, so the inherent defect-"chattering" of sliding mode control is effectively avoided.

(3) The technical solution proposed by the present invention adopts a position-current cascade control structure rather than the traditional position-speed-current three closed loop cascade structure, the design of the speed loop is omitted, the control framework is simplified, and the designed controller has the advantages of simple structure and the like, which is of great significance for the practical industrial application. Because of poor realizability and other reasons, the control algorithm with complex structure and difficult adjustment is not praised highly in the practical application.

In summary, the position control technology for a PMSM proposed by the present invention fully considers the influence of the current amplitude limited element, can effectively overcome the influence of internal and external system disturbances, can ensure that the rotor angle position tracking control of the motor can be realized rapidly and accurately even under the influence of disturbances, and has high anti-disturbance capability and position tracking performance. Meanwhile, the controller designed by the present invention also has the advantages of simple structure and the like. The technical solution proposed by the present invention has wide practical application prospect due to the characteristics of excellent anti-disturbance capability, and simple and feasible structure.

DETAILED DESCRIPTION

The technical solution proposed by the present invention is further described below in detail in combination with the drawings and specific embodiments.

Embodiment 1

Figure 1:
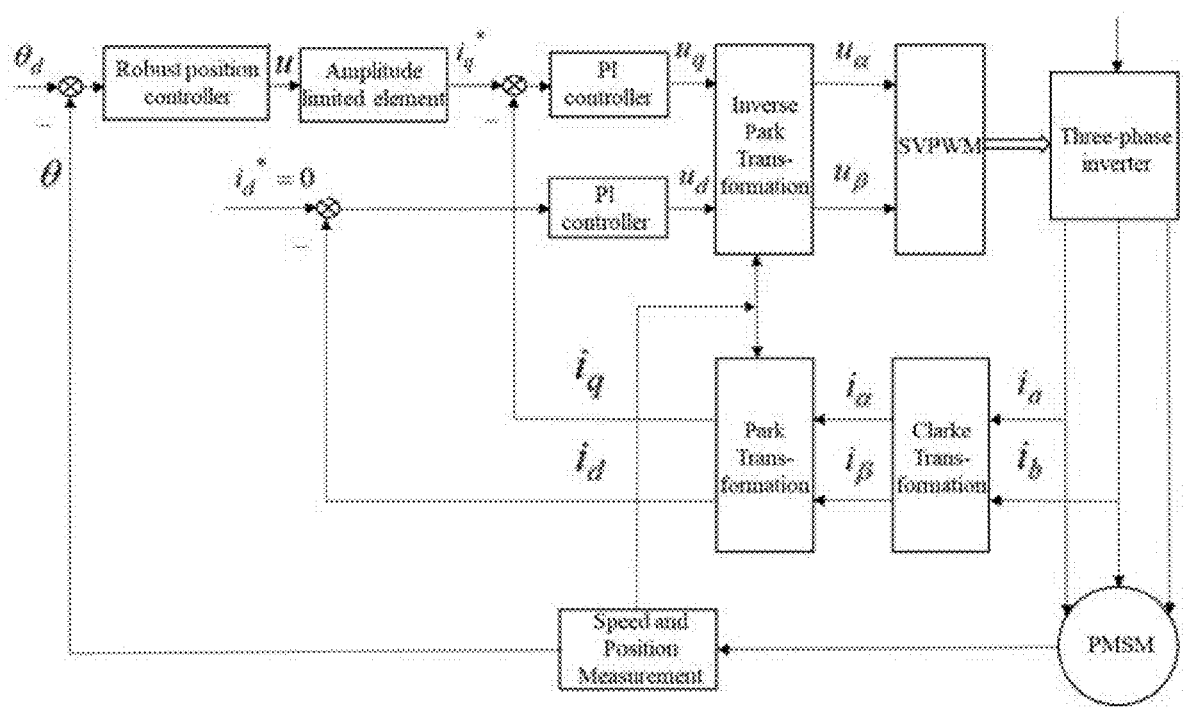
FIG. 1 is a block diagram of robust position control of a PMSM proposed by the present invention.

As shown in FIG. 1, this embodiment discloses a robust position control method for PMSM considering current limitation, comprising the following steps:

(I) determining a dynamic equation of a PMSM influenced by amplitude limited element and disturbances:

an object studied in this technical solution is a surface-mounted PMSM and is based on the $i_d=0$ vector control framework as shown in FIG. 1, this control framework takes the rotor coordinate system (d-q coordinate system) as a reference coordinate system, under this coordinate system, the voltage equation of the system is as follows:

$$u_d = Li_d + Ri_d - Ln\omega i_q u_q = Li_q + Ri_q + Ln\omega i_d - n\psi_f\omega \qquad (1)$$

where $u_d$ and $u_q$ represent components of stator voltages on d axis and q axis, $i_d, i_q$ represent stator currents on d axis and q axis respectively, meanwhile, R and L represent stator resistance and stator inductance, n represents the number of the pole pairs of the motor, $\psi_f$ represents a permanent magnet flux linkage of the rotor, and ω represents a speed of the motor.

The expression of the electromagnetic torque of the surface-mounted PMSM is as follows:

$$T_e = K_t i_q \qquad (2)$$

where $T_e$ represents electromagnetic torque, and $K_t$ represents a torque constant.

Next, a motion equation of the PMSM system is given as follows:

$$T_e - T_L = J\frac{d^2}{dt^2}\theta + B\frac{d}{dt}\theta \qquad (3)$$

where $T_L$ represents load torque, θ represents a motor rotor angle, J represents a motor moment of inertia and B represents a viscous friction coefficient.

In combination with equation (2) and equation (3), a state equation of the PMSM control system can be obtained:

$$\ddot{\theta} = \frac{K_t}{J}i_q - \frac{B}{J}\dot{\theta} - \frac{T_L}{J} \qquad (4)$$

It should be pointed out that the parameters in the above equation are all actual system parameters and the true values of these parameters are often difficult to obtain in practical application, so researchers can only obtain the nominal values of relevant parameters. Therefore, by further considering the influence of system parameters uncertainty, unknown load torque and current loop tracking error, equation (4) can be rewritten as:

$$\ddot{\theta} = \frac{K_{to}}{J_o} i_q^* - \frac{B_o}{J_o} \dot{\theta} + \left(\frac{K_{to}}{J_o} + \Delta\frac{K_t}{J}\right)(i_q - i_q^*) + \Delta\frac{K_t}{J} i_q^* - \Delta\frac{B}{J} \dot{\theta} - \frac{T_L}{J} \quad (5)$$

where $i^*_q$ represents a reference value of the stator current of q axis, $K_{to}$, $J_o$, and $B_o$ respectively represent nominal values of the torque constant, the moment of inertia, and the viscous friction coefficient, $$\Delta\frac{K_t}{J} = \frac{K_t}{J} - \frac{K_{to}}{J_o} \text{ and } \Delta\frac{B}{J} = \frac{B}{J} - \frac{B_o}{J_o}$$

represent deviations between the true values of the system parameters and the nominal values.

It can be known in combination with FIG. 1 that in order to prevent the motor current from exceeding the safety limit, a control input u generated by a position loop controller cannot be directly sent to the current inner loop as the reference value of the stator current of q axis, but an amplitude limited element needs to be applied after the position loop controller u to ensure that the given value of the motor current is constrained within a given range, thus realizing indirect limitation of the motor current. It is easy to know that when exceeding the limit of the amplitude limited element, the output value of the position loop controller may be limited, which may result in a deviation between the output value of the position loop and the current reference value actually sent to the current inner loop. Unlike most of the existing technical solutions, the present invention may consider the influence of the amplitude limited element on the closed loop system rather than simply neglecting the amplitude limited element.

The influence of the amplitude limited element on the reference current can be expressed by the following equation:

$$i_q^* = f(u) = \begin{cases} I_{max} & u \geq I_{max} \\ u & -I_{max} < u < I_{max} \\ -I_{max} & u \leq -I_{max} \end{cases} \quad (6)$$

where u(t) represents a control input to be designed, i.e. a PMSM position loop controller, $I_{max}$ represents a limitation value of the amplitude limited element. Then, the following relation holds:

$$i^*_q = f(u) = u + \Delta u \quad (7)$$

where $\Delta u = f(u) - u$ represents the influence caused by the amplitude limited element.

In combination with equations (5), (6) and (7), a complete dynamic equation of the PMSM which comprehensively considers the influence of the internal and external system disturbances and the amplitude limited element can be obtained:

$$\ddot{\theta} = \frac{K_{to}}{J_o} u - \frac{B_o}{J_o} \dot{\theta} - d \quad (8)$$

where d(t) represents a lumped disturbances term of which a specific expression t is $$d = -\left(\frac{K_{to}}{J_o} + \Delta\frac{K_t}{J}\right)(i_q - i_q^*) - \Delta\frac{K_t}{J} i_q^* + \Delta\frac{B}{J}\dot{\theta} + \frac{T_L}{J} - \frac{K_{to}}{J_o}\Delta u \quad (9)$$

for lumped disturbances d(t) and first and second derivatives thereof, the following bounded assumption is usually made:

$$d, \dot{d}, \ddot{d} \in \zeta_\infty \quad (10)$$

(II): determining a control objective and constructing auxiliary signals:

It is assumed that $\theta_d(t)$ represents a target rotor position of the PMSM, that is, a position given signal, and it is assumed that a continuous third derivative thereof is bounded, that is, $$\theta_d, \dot{\theta}_d, \ddot{\theta}_d, \dddot{\theta}_d \in \zeta_\infty \quad (11)$$

in the position control of the PMSM, the main object is to ensure that the motor rotor angle can reach the given position accurately in a limited time, that is $$\lim_{t \to \infty} \theta(t) = \theta_d \quad (12)$$

The position tracking error signal can be further defined as $$e_1 = \theta_d - \theta \quad (13)$$

On this basis, in order to facilitate follow-up controller design and stability analysis, auxiliary signals of the following forms are constructed $$e_2 = \dot{e}_1 + \alpha e_1, r = \dot{e}_2 + \beta e_2 \quad (14)$$

where both $\alpha$ and $\beta$ are positive constants greater than 0.

According to equations (8), (13) and (14), it can be obtained that:

$$r = -\frac{K_{to}}{J_o} u + \ddot{\theta}_d + \frac{B_o}{J_o}\dot{\theta}_d + d + \left(\alpha + \frac{B_o}{J_o}\right)e_1 + \beta e_2 \quad (15)$$

by taking the derivative of the above equation and transforming same, it is easy to know that:

$$\dot{r} = -\frac{K_{to}}{J_o}\dot{u} - e_2 - r + \left(\alpha + \frac{B_o}{J_o}\right)e_1 + \beta e_2 + e_2 + r + \dddot{\theta}_d + \frac{B_o}{J_o}\ddot{\theta}_d + \dot{d} \quad (16)$$

if $$H = \left(\alpha + \frac{B_o}{J_o}\right)e_1 + \beta e_2 + e_2 + r_2 \quad (17)$$

$$N = \dddot{\theta}_d + \frac{B_o}{J_o}\ddot{\theta}_d + \dot{d} \quad (18)$$

then $$\dot{r} = -\frac{K_{to}}{J_o}\dot{u} - e_2 - r + H + N \quad (19)$$

The boundednesses of H(t) and N(t) are analyzed below. First, the boundedness of N(t) is analyzed, according to equations (10) and (11), it is easy to obtain:

$$\|N\|_\infty \le \varepsilon_1, \|\dot{N}\|_\infty \le \varepsilon_2 \tag{20}$$

where $\varepsilon_1$ and $\varepsilon_1$ are positive constants.

Then, the boundedness of H(t) is analyzed, and according to equation (14), if $$\dot{e}_2 = r - \beta e_2, \dot{e}_1 = \dot{e}_2 - \alpha \dot{e}_1 = r - \beta e_2 - \alpha(e_2 - \alpha e_1) = r - (\alpha+\beta)e_2 + \alpha^2 e_1 \tag{21}$$

H(t) can be rewritten as $$H(t) = q \cdot Z \tag{22}$$

where $z = (r, e_1, e_2)^T$ and $$q = \begin{bmatrix} \left(\alpha + \dfrac{B_o}{J_o}\right) + \beta + 1 \\ \left(\alpha + \dfrac{B_o}{J_o}\right)\alpha^2 \\ -\left(\alpha + \dfrac{B_o}{J_o}\right)(\alpha+\beta) - \beta^2 + 1 \end{bmatrix}^T \tag{23}$$

it can be known that $$\|H\|_\infty = |H| = \|q\|\|Z\| \ge \rho\|Z\| \tag{24}$$

where $\rho \ge \|q\|$ is a positive constant.

(III) Designing a robust position controller and conducting stability analysis of the closed loop system:

on the basis of the first two parts, the present invention provides a robust position controller for a PMSM as follows:

$$u = \dfrac{J_o}{K_{to}}\left[(k+1)e_2 - (k+1)e_2(0) + \int_0^t [(k+1)\beta e_2(\tau) + 2\lambda \mathrm{sgn}(e_2(\tau))]d\tau\right] \tag{25}$$

where k and $\lambda$ are positive adjustable control gains.

The controller in (25) is substituted into equation (19), obtaining $$\dot{r} = -(k+1)r - 2\lambda \mathrm{sgn}(e_2) - e_2 - r + N + H \tag{26}$$

System stability analysis is conducted below to prove that the system control object mentioned in part (II) can be achieved. First, the following theorem is given:

Theorem: when the following condition $$k \ge \dfrac{\rho^2}{l}\left(l = \min\left(2, \left(\alpha - \dfrac{1}{2}\right), \left(\beta - \dfrac{1}{2}\right)\right)\right), \tag{27}$$

$$\lambda > \varepsilon_1 + \dfrac{\varepsilon_2}{\beta}, \alpha > \dfrac{1}{2}, \beta > \dfrac{1}{2}$$

holds, the rotor angle of the PMSM will accurately reach a target position under the action of the controller in (25) designed by the present invention, that is, $$\lim_{t \to \infty} \theta(t) = \theta_d \tag{28}$$

Proof: a Lyapunov candidate function of the following form is constructed:

$$V = \dfrac{1}{2}r^2 + \dfrac{1}{2}e_1^2 + \dfrac{1}{2}e_2^2 + 2\lambda|e_2| - Ne_2 \tag{29}$$

Definition $$\Lambda = 2/\lambda|e_2| - Ne_2 \tag{30}$$

The following analysis shows that it is always greater than 0. It can be known from $Ne_2 \le \|N\|_\infty|e_2|$ that $$-Ne_2 \ge -\|N\|_\infty|e_2| \tag{31}$$

In combination with equation (20) and gain condition in (27), it can be deduced that $$2\lambda|e_2| - \|N\|_\infty|e_2| \ge \lambda|e_2| \ge 0 \tag{32}$$

Then $$\Lambda = 2\lambda|e_2| - Ne_2 \ge 2\lambda|e_2| - \|N\|_\infty|e_2| \ge \lambda|e_2| \ge 0 \tag{33}$$

Meanwhile, if $-Ne_2 \le \|N\|_\infty|e_2|$, then $$\Lambda = 2\lambda|e_2| - Ne_2 \le (2\lambda + \|N\|_\infty)|e_2| \tag{34}$$

In combination with equations (33) and (34), it is obtained that $$0 \le \lambda|e_2| \le 2\lambda|e_2| - \|N\|_\infty|e_2| \le \Lambda \le (2\lambda + \|N\|_\infty)|e_2| \tag{35}$$

Further, according to the form of equation (29), it can be known that $$\dfrac{1}{2}Z^2 + \lambda|e_2| \le V \le \dfrac{1}{2}Z^2 + (2\lambda + \|N\|_\infty)|e_2| \tag{36}$$

The above result shows that the designed v(t) is non-negative, so it can be used as a Lyapunov function. By taking the derivative of the Lyapunov function, in combination with equations (14) and (26), it can be obtained that $$\begin{aligned}\dot{V} &= r\dot{r} + e_1\dot{e}_1 + e_2\dot{e}_2 + 2\lambda\dot{e}_2\mathrm{sgn}(e_2) - \dot{N}e_2 - N\dot{e}_2 \\ &= -(k+1)r^2 - 2\lambda r\mathrm{sgn}(e_2) - e_2 r - r^2 + rN + rH + \\ &\quad e_1(e_2 - \alpha e_1) + e_2(r - \beta e_2) + 2\lambda\dot{e}_2\mathrm{sgn}(e_2) - \dot{N}e_2 - N\dot{e}_2 \\ &= -(k+1)r^2 - 2\lambda\dot{e}_2\mathrm{sgn}(e_2) - 2\lambda\beta e_2\mathrm{sgn}(e_2) - e_2 r - r^2 + Ne_2 + \\ &\quad \beta Ne_2 + rH - \alpha e_1^2 + e_1 e_2 - \beta e_2^2 + e_2 r + 2\lambda\dot{e}_2\mathrm{sgn}(e_2) - \\ &\quad \dot{N}e_2 - N\dot{e}_2 \\ &= -(k+1)r^2 - 2\lambda\beta e_2\mathrm{sgn}(e_2) - r^2 + \beta Ne_2 + rH - \alpha e_1^2 + e_1 e_2 - \\ &\quad \beta e_2^2 - \dot{N}e_2\end{aligned} \tag{37}$$

because $$e_2\mathrm{sgn}(e_2) = |e_2|, e_1 e_2 \le \dfrac{1}{2}e_1^2 + \dfrac{1}{2}e_2^2, \beta Ne_2 \le \beta\|N\|_\infty|e_2|, \tag{38}$$

$$\dot{N}e_2 \le \|\dot{N}\|_\infty|e_2|, rH \le |r|\|H\|_\infty$$

equation (37) can be simplified as $$\dot{V} \le -(k+1)r^2 - 2\lambda\beta|e_2| - r^2 + \beta\|N\|_\infty|e_2| + \tag{39}$$

$$|r|\|H\|_\infty - \left(\alpha - \dfrac{1}{2}\right)e_1^2 - \left(\beta - \dfrac{1}{2}\right)e_2^2 - \|\dot{N}\|_\infty|e_2|$$

Further, by equations (20), (24) and (27), it can be obtained that $$-\lambda\beta|e_2| \le -(\beta\varepsilon_1 + \varepsilon_2)|e_2|, \|\dot{N}\|_\infty|e_2| \le \varepsilon_2|e_2|,$$

$$\beta\|N\|_\infty|e_2| \le \beta\varepsilon_1|e_2|, |r|\|H\|_\infty \le \rho\|Z\||r| \tag{40}$$

Thus, equation (39) can be rewritten as $$\dot{V} \leq \left[-2r^2 - \left(\alpha - \frac{1}{2}\right)e_1^2 - \left(\beta - \frac{1}{2}\right)e_2^2\right] + \rho\|Z\||r| - kr^2 - \lambda\beta|e_2| \quad (41)$$

$$\leq \left[-2r^2 - \left(\alpha - \frac{1}{2}\right)e_1^2 - \left(\beta - \frac{1}{2}\right)e_2^2\right] + \frac{\rho^2\|Z\|^2}{k} - \frac{\rho^2\|Z\|^2}{k} +$$

$$\rho^2\|Z\|^2|r| - kr^2 - \lambda\beta|e_2|$$

$$\leq -\left(l - \frac{\rho^2}{k}\right)\|Z\|^2$$

where $$l = \min\left(2, \left(\alpha - \frac{1}{2}\right), \left(\beta - \frac{1}{2}\right)\right), \text{ if } k \geq \frac{\rho^2}{l},$$

the following equation holds $$\dot{V} \leq 0 \quad (42)$$

According to the results of equations (36) and (42), it can be obtained that $$V, r, e_1, e_2 \in \zeta_\infty \quad (43)$$

According to the expression of the controller in (25), it can be further known that $$u \in \zeta_\infty \quad (44)$$

The above results show that both the signals and the control input in the closed loop system are bounded. Next, according to equations (29) and (42), by using LaSalle Yoshizawa Theorem, it can be obtained that $$\lim_{t \to \infty}\|Z\| = 0 \Rightarrow \lim_{t \to \infty} e_1 = 0 \quad (45)$$

that is, $$\lim_{t \to \infty} \theta(t) = \theta_d \quad (46)$$

The theorem is proved, that is, the rotor angle of the PMSM is accurately traced to a given target position.
(IV) Realizing a Technical Solution:

Here, the present invention briefly introduces how to use the method in actual industry. First, the position and speed of the motor are measured in real time by a sensor installed in the PMSM first, system state variables are obtained and substituted into the robust position controller in (25) designed by the present invention to obtain a control signal, the control signal is taken as a controller of a position loop of the PMSM shown in FIG. 1, so as to accurately track the position of the motor rotor and effectively suppress the influence of disturbances including system parameters uncertainty, unknown load torque and current limitation to ensure that a PMSM system can still realize a quick and accurate positioning function under the influence of disturbances.

Figure 2:
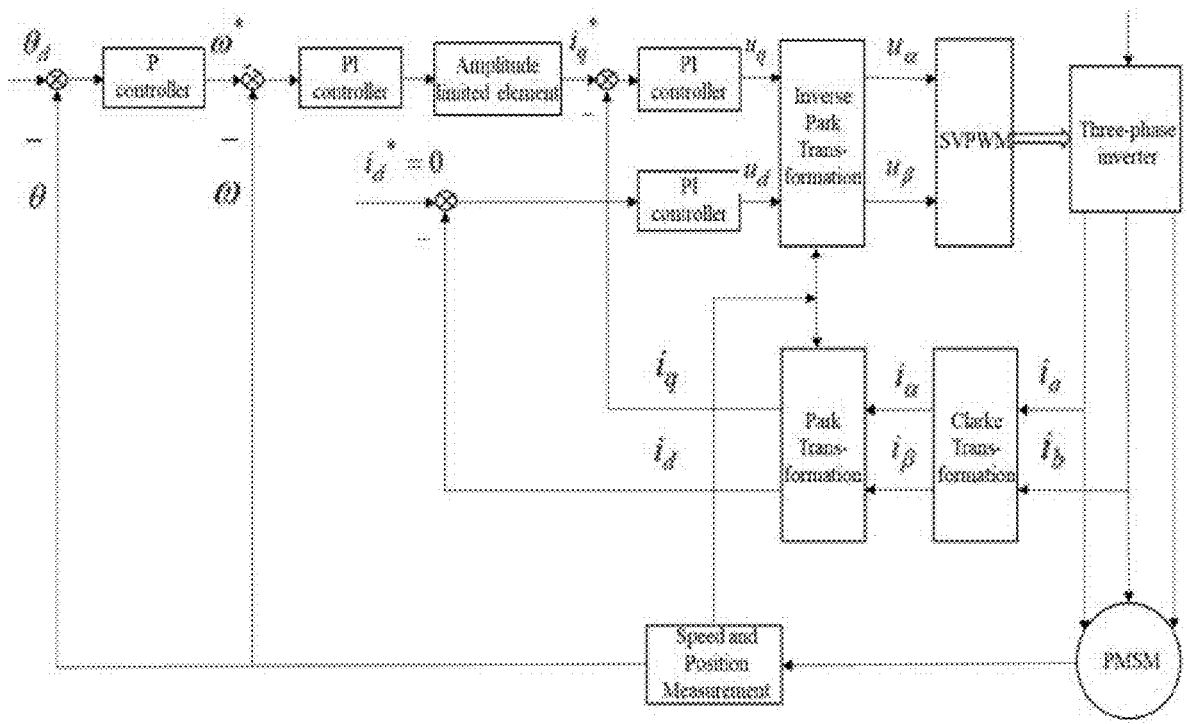
FIG. 2 is a block diagram of an industrial common three closed loop position control of PMSM.

Simulation verification: FIG. 1 is a structural diagram of the technology proposed by the present invention. The designed robust controller is used in the position loop and the classical PI controller is used in the current loop. FIG. 2 shows one of the most common control frameworks in industrial application. A P controller is used in the position loop, and PI controllers are used in both the speed loop and current loop. In the present invention, the two control schemes are simulated and compared to verify the effectiveness and the superiority of the technology proposed by the present invention.

Figure 3A:
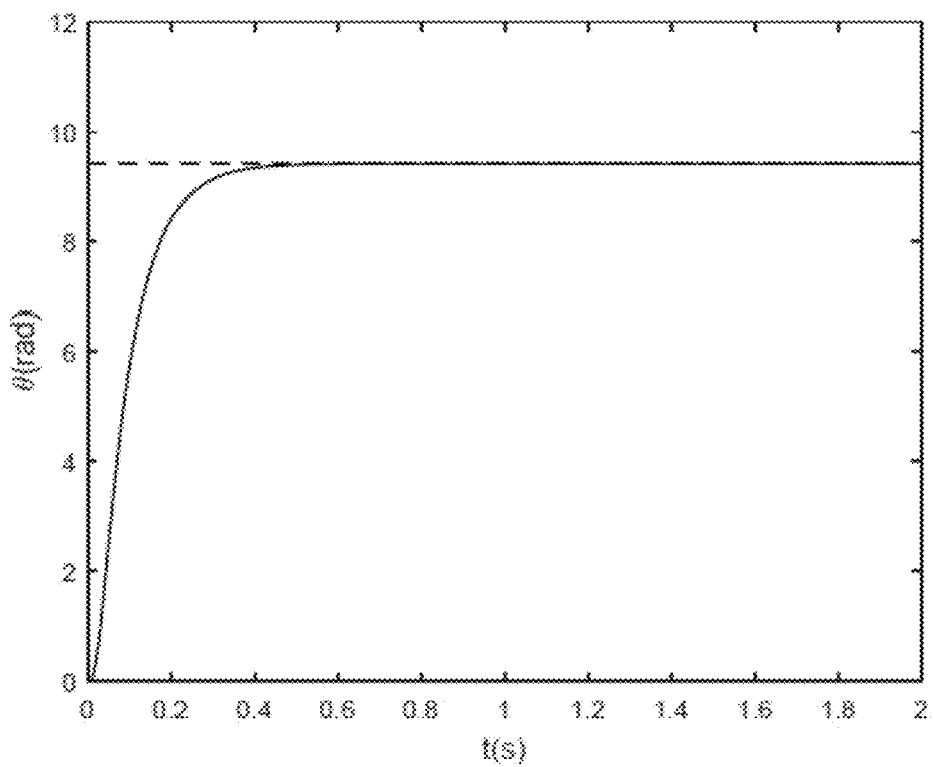
FIG. 3(a) shows a response curve of a rotor angle θ of a PMSM under the control of the method proposed by the present invention in an ideal condition.
Figure 3B:
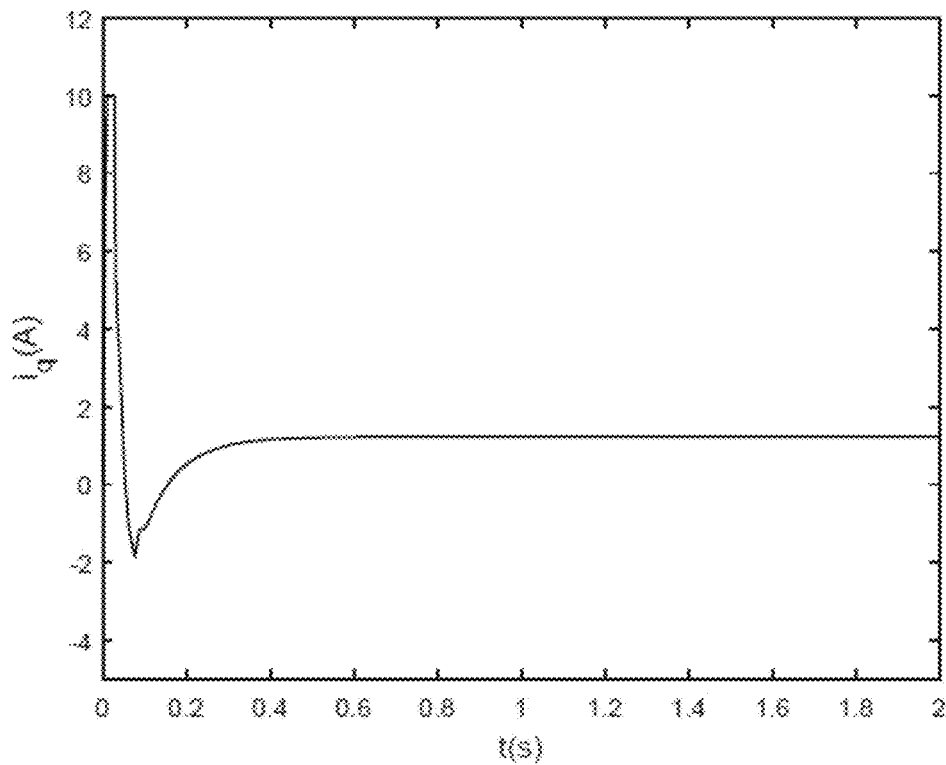
FIG. 3(b) shows a curve of a q axis stator current $i_q$ of a PMSM in the method proposed by the present invention in an ideal condition.
Figure 4A:
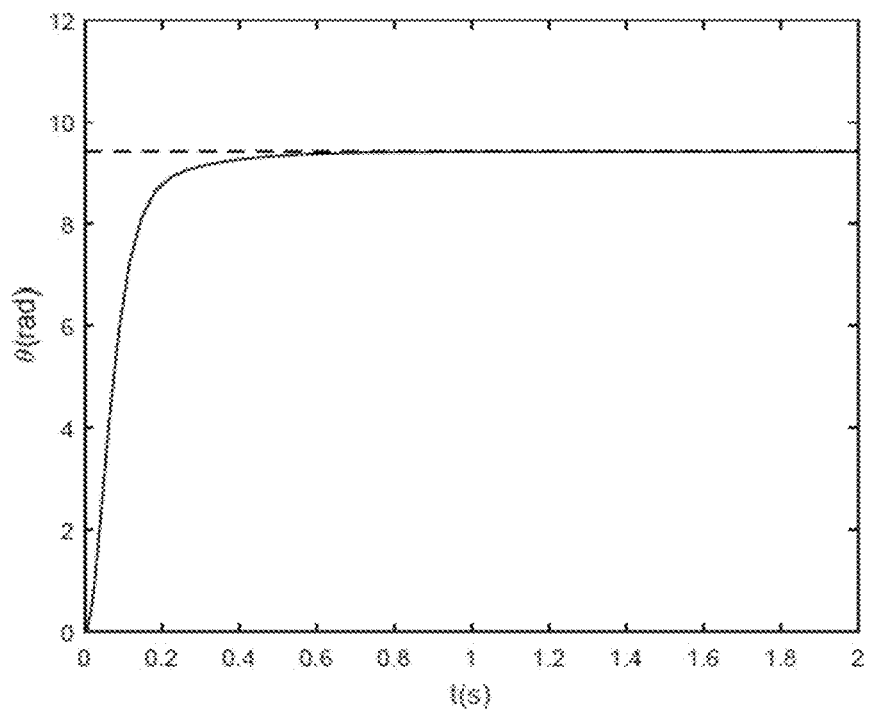
FIG. 4(a) shows a response curve of a rotor angle θ of a PMSM under the control of an industrial common method in an ideal condition.
Figure 4B:
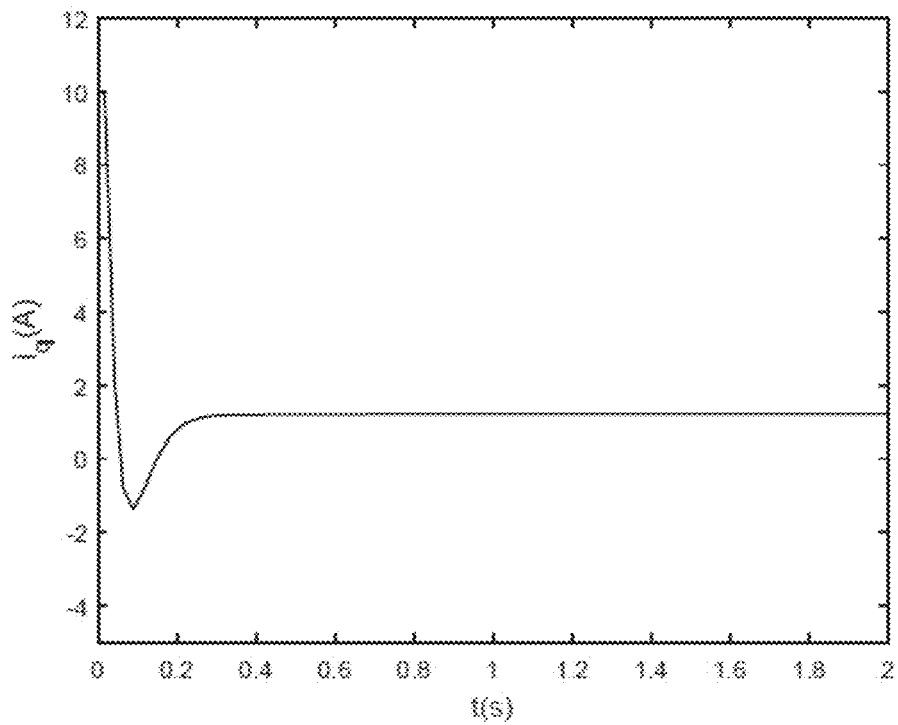
FIG. 4(b) shows a curve of a q axis stator current $i_q$ of a PMSM in an industrial common method in an ideal condition.

Simulation 1: position tracking performance of the technology proposed in an ideal condition The control performance of the proposed method in an ideal condition is considered in this simulation, that is, the true values of the system parameters are known and equal to the nominal values thereof, and no influence of external disturbances such as load torque change, etc. are present. In this simulation, system parameters are set as: $J=J_o=0.011$ kg·m$^2$, $B=B_o=0.005$ N·m·s/rad, $K=K_{to}=3.6$ N·m/A, the load torque $T_L=4.5$ N·m, and the limitation value of the current amplitude limited element is ±10A. The simulation results are shown in FIGS. 3-4, wherein FIG. 3(a) and FIG. 3(b) show simulation results of the method proposed by the present invention, FIG. 4(a) and FIG. 4(b) show simulation results of the industrial common scheme, the solid lines in FIG. 3(a) and FIG. 4(a) represent response curves of the rotor of the PMSM and the dashed line represents the target position $\theta_d=3\pi$ of the rotor, and FIG. 3(b) and FIG. 4(b) respectively show the curves of the q axis stator current $i_q$ of the method proposed by the present invention and the industrial common method. It can be seen from FIG. 3(b) and FIG. 4(b) that the amplitude limited element has a constraint effect, so $i_q$ is limited within ±10A, that is, the influence of the amplitude limited element is considered in this simulation. Further, it can be known by comparing FIG. 3(a) and FIG. 4(a) that the method proposed by the present invention makes the motor rotor angle accurately reach the given target position at about 0.45 s, while the reaching time of the industrial common scheme is above 0.65 s, indicating that compared with the industrial common scheme, the PMSM position controller designed by the present invention has faster adjustment speed, so that the PMSM system can obtain better dynamic performance.

Figure 5A:
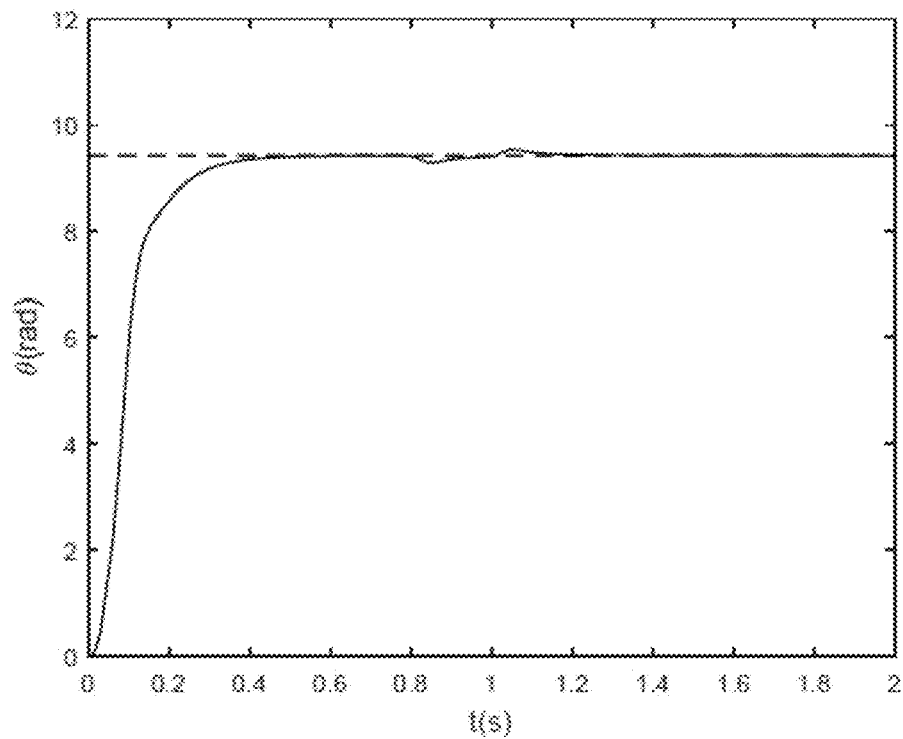
FIG. 5(a) shows a response curve of a rotor angle θ of a PMSM under the control of the method proposed by the present invention under disturbances influence.
Figure 5B:
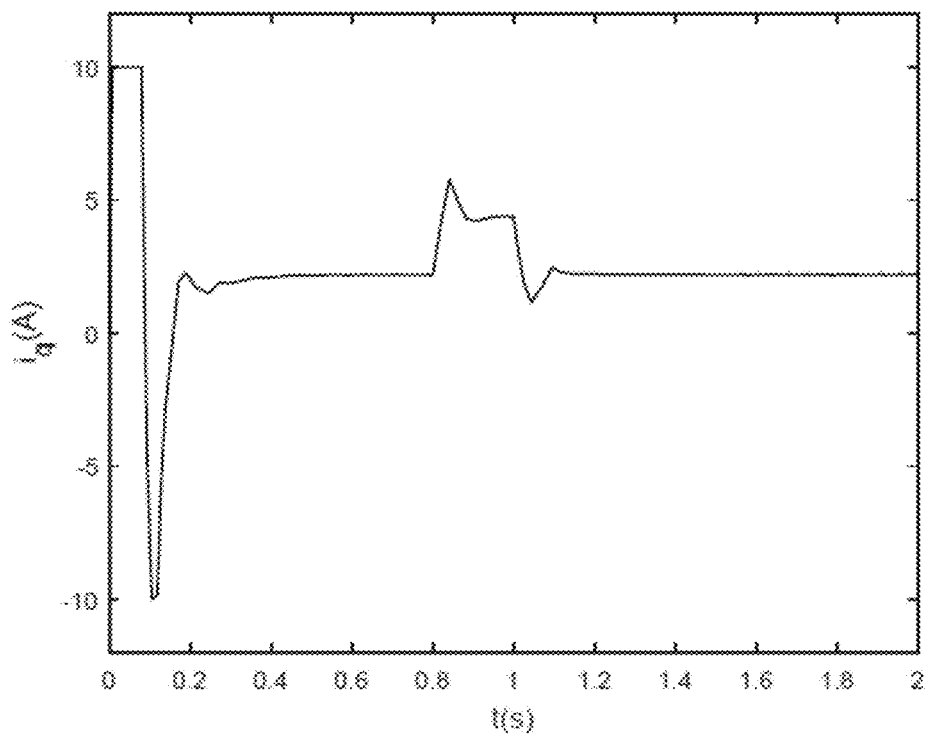
FIG. 5(b) shows a curve of a q axis stator current $i_q$ of a PMSM in the method proposed by the present invention under disturbances influence.
Figure 6A:
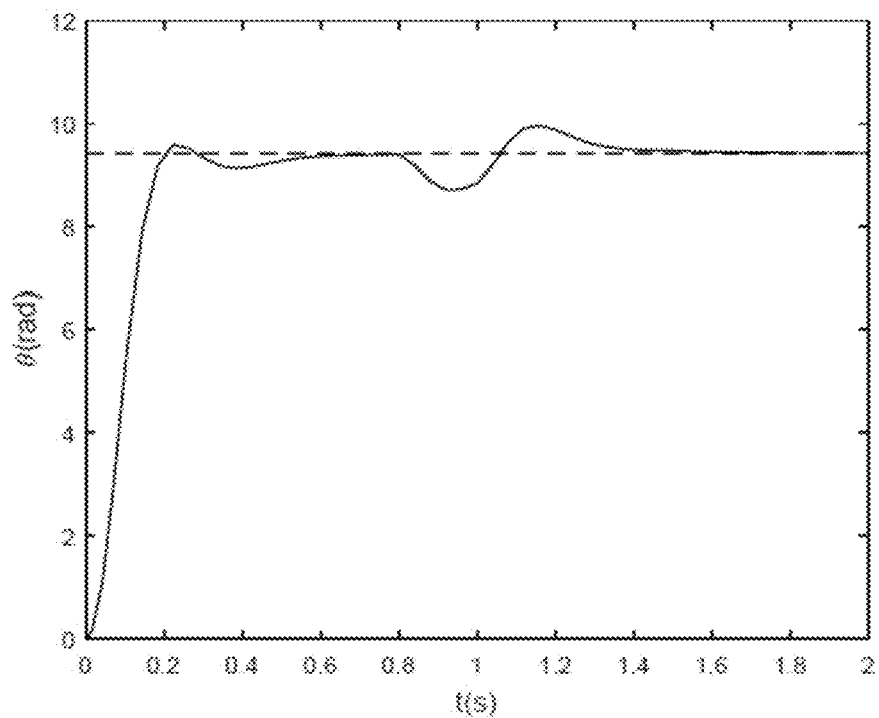
FIG. 6(a) shows a response curve of a rotor angle θ of a PMSM under the control of an industrial common method under disturbances influence.
Figure 6B:
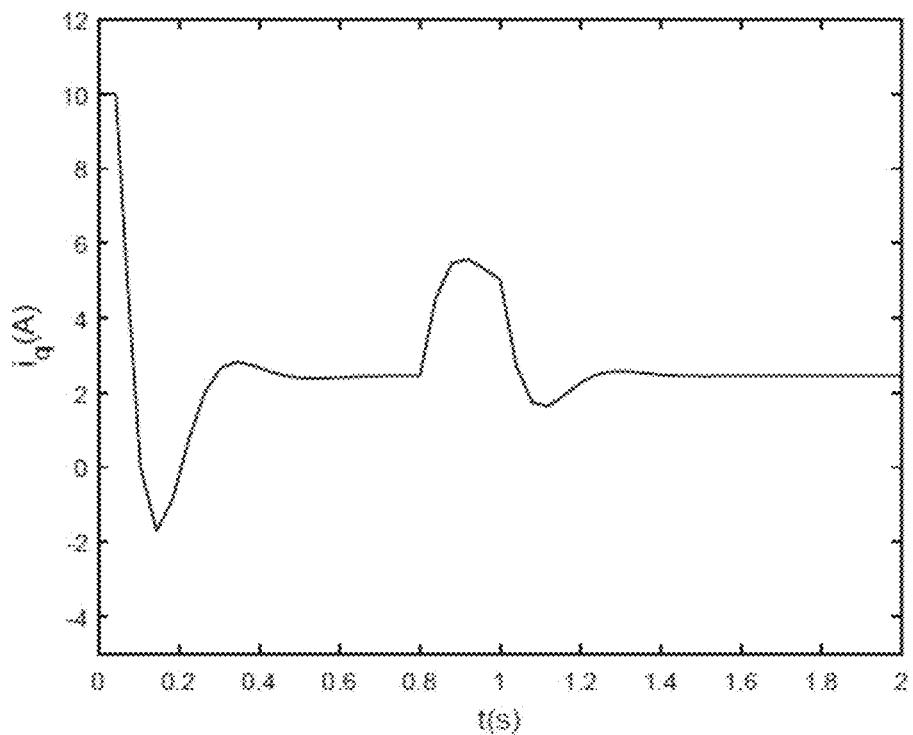
FIG. 6(b) shows a curve of a q axis stator current $i_q$ of a PMSM in an industrial common method under disturbances influence.

Simulation 2: position tracking performance of the technology proposed under disturbance influence Further, in order to verify the robustness of the proposed method, the influence of internal and external disturbances including system parameters uncertainty, sudden change of outside load torque and the like is considered in simulation 2, the moment of inertia and the viscous friction coefficient are adjusted to $J=0.022$ kg·m$^2$, $B=0.025$ N·m·s/rad, and other system parameters and controller parameters are unchanged. Meanwhile, in order to simulate the load torque change phenomenon, adjusting the load torque to 9 N·m at 0.8 s and adjusting the load torque back to 4.5 N·m at is are simulated. The simulation results are shown in FIGS. 5-6, wherein FIG. 5(a) and FIG. 5(b) show simulation results of the method proposed by the present invention, and FIG. 6(a) and FIG. 6(b) show simulation results of the industrial common scheme. Similarly, the solid lines in FIG. 5(a) and FIG. 6(a) represent response curves of the rotor of the PMSM, while the dotted line represents the target position $\theta_d$-$3\pi$ of the rotor, and FIG. 5(b) and FIG. 6(b) respectively show curves of q axis stator currents $i_q$ of the method proposed by the present invention and the industrial common method. FIG. 5(b) and FIG. 6(b) show that the role of the amplitude limited element is still taken into account in simulation 2. It can be known from FIG. 5(a) that when the influence of the amplitude limited element and the change of the system parameters are present, the method proposed by the present invention can still maintain good position tracking performance, and the motor rotor still reaches the given position at about 0.45 s. Meanwhile, when the load torque suddenly changes, under the adjustment action of the controller designed by the present invention, the motor rotor fluctuates slightly in position, the fluctuation range being only ±0.1 rad, and soon returns to the stable state, the position tracking error re-converges to 0. It can be seen from the dynamic response curve of the rotor of the industrial common scheme in FIG. 6(a), when system parameters change, the control effect of the industrial common three closed loop control scheme is reduced sharply, and the motor rotor angle is overshot, and is only stabilized at the given target position at about 0.7 s. Meanwhile, when the load torque suddenly changes, the motor rotor obviously fluctuates in position, the fluctuation range reaching ±0.7 rad which is far greater than the constraint range of the method proposed by the present invention.

In summary, the results of simulation 1 and simulation 2 show that compared with the three closed loop control scheme commonly used in industry, the technical solution proposed by the present invention has a faster dynamic response and can realize position tracking control of the PMSM within a short time, more importantly, the proposed technical solution has strong robustness to system parameters uncertainty, unknown load torque disturbance, etc., and can still ensure good position control performance under the change of system parameters and load torque, which means that the present invention has an important practical application prospect and can be applied to actual industrial production.

The invention claimed is:

1. A robust position control method for a permanent magnet synchronous motor (PMSM) considering current limitation, comprising steps of:

step 1: determining a dynamic equation of PMSM influenced by amplitude limited element and disturbances:

in an actual system, expressing a dynamic equation of a PMSM control system is as:

$$\ddot{\theta} = \frac{K_t}{J} i_q - \frac{B}{J}\dot{\theta} - \frac{T_L}{J};$$

where $\theta$ represents motor rotor angle, $i_q$ represents q axis stator current in d-q coordinate system, $K_t$ represents torque constant, $J$ represents moment of inertia of the motor, $B$ represents viscous friction coefficient, $T_L$ represents load torque;

further considering the influence of system parameters uncertainty, unknown load torque and current loop tracking error, rewriting the dynamic equation of the PMSM as:

$$\ddot{\theta} = \frac{K_{to}}{J_o} i_q^* - \frac{B_o}{J_o}\dot{\theta} + \left(\frac{K_{to}}{J_o} + \Delta\frac{K_t}{J}\right)(i_q - i_q^*) + \Delta\frac{K_t}{J} i_q^* - \Delta\frac{B}{J}\dot{\theta} - \frac{T_L}{J};$$

where $i_q^*$ represents reference value of the stator current of q axis, $K_{to}$, $J_o$, and $B_o$ respectively represent nominal values of the torque constant, the moment of inertia, and the viscous friction coefficient, $$\Delta\frac{K_t}{J} = \frac{K_t}{J} - \frac{K_{to}}{J_o} \text{ and } \Delta\frac{B}{J} = \frac{B}{J} - \frac{B_o}{J_o}$$

represent deviations between the true values of the system parameters and the nominal values;

expressing the influence of the amplitude limited element on the reference current by the following equation:

$$i_q^* = f(u) = \begin{cases} I_{max} & u \geq I_{max} \\ u & -I_{max} < u < I_{max} \\ -I_{max} & u \leq -I_{max} \end{cases};$$

where u(t) represents control input to be designed, i.e. a PMSM position loop controller, $I_{max}$ represents limitation value of the amplitude limited element;

thus, the following relation holds: $i_q^* = f(u) = u + \Delta u$;

where $\Delta u = f(u) - u$ represents influence caused by the amplitude limited element;

obtaining a complete dynamic equation of the PMSM comprehensively considering influence of the system disturbances and amplitude limited element:

$$\ddot{\theta} = \frac{K_{to}}{J_o} u - \frac{B_o}{J_o}\dot{\theta} - d;$$

where d(t) represents lumped disturbances term of which the specific expression is:

$$d = -\left(\frac{K_{to}}{J_o} + \Delta\frac{K_t}{J}\right)(i_q - i_q^*) - \Delta\frac{K_t}{J} i_q^* + \Delta\frac{B}{J}\dot{\theta} + \frac{T_L}{J} - \frac{K_{to}}{J_o}\Delta u;$$

step 2: determining a control objective and constructing auxiliary signals:

in PMSM position control, it is guaranteed that the motor rotor angle can accurately reach a given position within a limited time, i.e.

$$\lim_{t \to \infty} \theta(t) = \theta_d;$$

where $\theta_d(t)$ represents target rotor position of the PMSM;

further defining position tracking error signal as $e_1 = \theta_d - \theta$;

for the follow-up controller design and stability analysis, constructing auxiliary signals of the following forms:

$e_2 = \dot{e}_1 + \alpha e_1$, $r = \dot{e}_2 + \beta e_2$;

where both $\alpha$ and $\beta$ are positive constants greater than 0;

step 3: designing a robust position controller and conducting stability analysis of the closed loop system:

based on step 1 and step 2, giving a PMSM robust position controller of the following form:

$$u = \frac{J_o}{K_{to}}\left[(k+1)e_2 - (k+1)e_2(0) + \int_0^t [(k+1)\beta e_2(\tau) + 2\lambda\text{sgn}(e_2(\tau))]d\tau\right];$$

where k and $\lambda$ represent positive control gains;

constructing a Lyapunov function candidate:

$$V = \frac{1}{2}r^2 + \frac{1}{2}e_1^2 + \frac{1}{2}e_2^2 + 2\lambda|e_2| - Ne_2;$$

in combination with the Lyapunov stability method and LaSalle-Yoshizawa theorem, proving asymptotic stability of the closed loop system;

step 4: measuring the position and speed of the motor in real time by a sensor installed in the PMSM first, obtaining system state variables and substituting same into the robust position controller given in step 3 to obtain control signal, taking the control signal as controller of a position loop of the PMSM, so as to accurately track the position of the motor rotor and effectively suppress the influence of disturbances including system parameters uncertainty, unknown load torque and current limitation to ensure that a PMSM system can still realize a quick and accurate positioning function under the influence of disturbances.

* * * * *